United States Patent Office 3,028,598
Patented Apr. 3, 1962

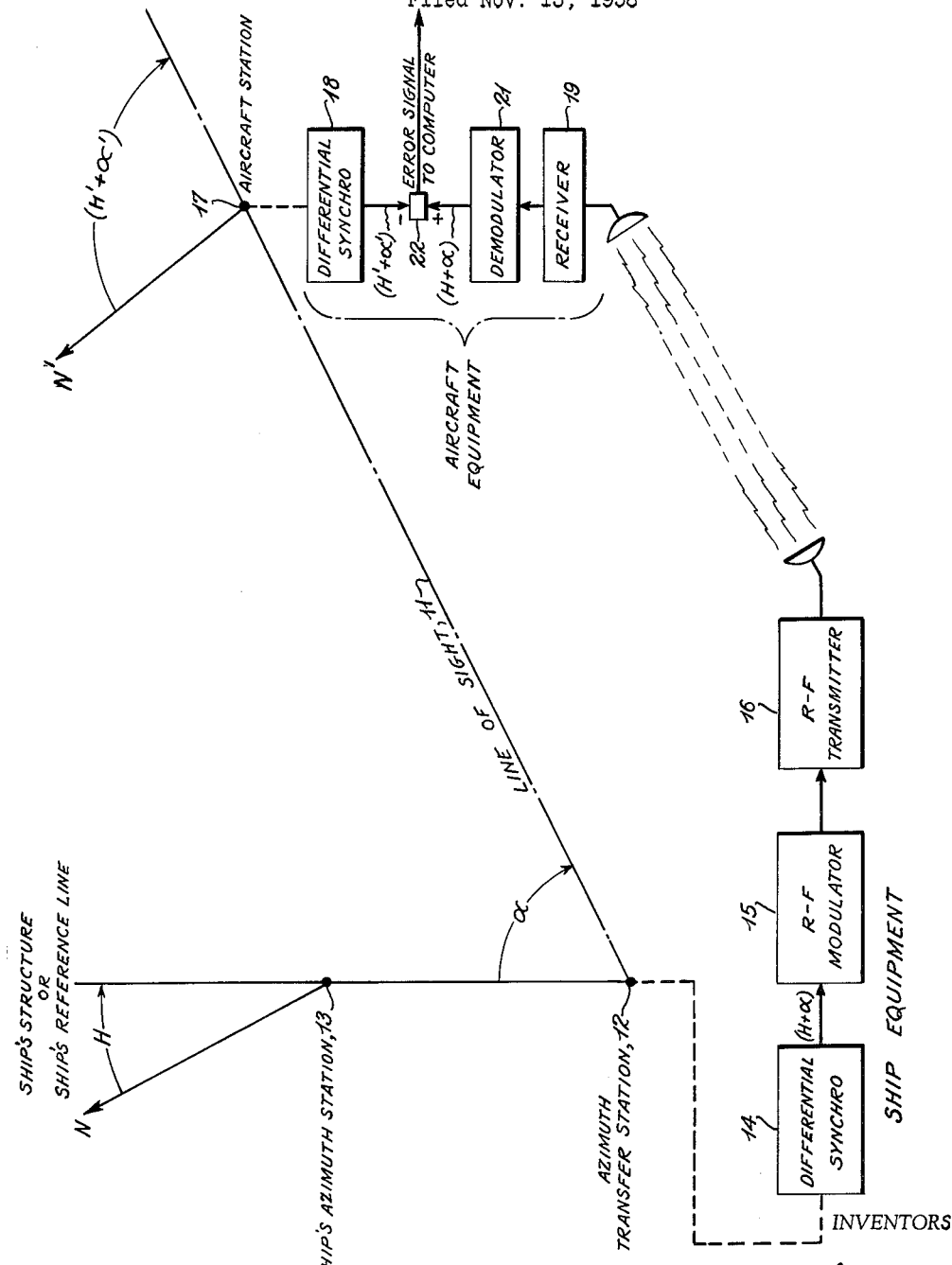

3,028,598
AZIMUTH TRANSFER SYSTEM
Thomas E. Gibbs, Arlington, and Walter R. Hedeman, Dallas, Tex., assignors to Texas Instruments Incorporated, Dallas, Tex., a corporation of Delaware
Filed Nov. 13, 1958, Ser. No. 773,631
6 Claims. (Cl. 343—101)

The present invention relates to aids for navigation and has particular reference to an improved azimuth transfer technique.

One of the most important applications of the invention is its use with aircraft carriers and their associated aircraft.

Perhaps the outstanding advantage of the new technique is its extreme versatility in that either optical or radar methods may be utilized depending on the tactical situation and weather conditions prevailing at the time.

An additional advantage of this azimuth transfer system is that it does not require any appreciable additional equipment for use by military ships and aircraft.

With the new arrangement it is possible to impart accurate azimuth information automatically to an aircraft after it is airborne.

In the present invention an angle is measured between the line of sight joining a ship and an aircraft, and north as known to the ship. This angle is converted to a suitable signal which is used to modulate a transmitter on the ship. The line of sight between the ship and the aircraft is established within the aircraft either by optical or radar means. The angle between the north indication in the aircraft and the line of sight is measured within the aircraft and compared with the radio signal received from the ship. The difference signal obtained by subtracting the signal received from the ship, and the aircraft's own knowledge of north signal, is used to correct the aircraft's knowledge of north.

These as well as further advantages which are inherent in the invention will become apparent from the following description, reference being had to the accompanying drawing wherein the figure shows a block diagram of a system embodying the present invention.

In order to better understand in more detail this method of azimuth transfer, reference is made to the figure. The ships knowledge of north N is determined accurately at ship azimuth station 13. It may be established by any of the following methods:

(a) Ship's gyrocompass
(b) Automatic star tracker
(c) Stellar R-F noise tracker

Regardless of how north information line N is established this information is known within the ship relative to some portion of the ship's structure. At ship azimuth station 13, the angle between north information line N and the ship's structure used as a reference line is determined as angle H. This angle can be accurately measured as a one or two speed synchro signal or an inductosyn signal.

The line of sight 11 from the ship azimuth transfer station 12 to the aircraft station 17 is established on the ship by either optical or radar means. The more accurate of the two is the optical method but functionally the two methods are identical.

In the optical method the aircraft flies out five to ten miles from the ship's stern, turns 180° and flies directly toward the ship. In this maneuver the pilot keeps the ship in his gunsight for approximately one minute and the ship's optical station located at azimuth transfer station 12 tracks the aircraft by the use of a gyro-stabilized optical gunsight. The angle α is measured at the azimuth transfer station 12 and summed with the angle H. A differential synchro 14 on the ship's optical or radar trackers permits summing $(H+\alpha)$ in one instrument. The accuracy of differential synchro 14 should be compatible with the accuracy of the azimuth source. The sum of the angles $H+\alpha$ is fed from differential synchro 14 into R-F modulator 15 and thence to R-F transmitter 16 all of which equipment is located on board the ship. The radio equipment need not have a range of more than 10 to 20 miles and the energy can be confined to a small core directed to the ship's stern.

The radar method is identical to the optical method except that a gun-laying radar at azimuth transfer station 12 is used to track the aircraft during the one minute azimuth stern approach run.

It will be noted that the stern approach azimuth run is specified above. The reason for this is that were the aircraft approaching from athwartship it would be necessary to continuously change heading in order to keep the ship in its gunsights if the ship were moving. This would cause the angle α to have additional components which could only be eliminated with additional computer equipment. While there may be small values of $\dot{\alpha}$ and $\ddot{\alpha}$ which exist during a stern approach, they will be largely integrated out during the one minute stern approach.

The line of sight 11 between the ship azimuth transfer station 12 and the aircraft station 17 is established within the aircraft also by either of two methods. The pilot tracks the ship with his optical sight or the radar operator tracks the ship with the MTI track radar.

At aircraft station 17 within the aircraft, the angle between line of sight 11 and inertial platform north line N' is measured as a sum of synchro signals by differential synchro 18. Differential synchro 18 should have a high degree of accuracy and must be added as a part of the optical sight and the track radar antenna in order to permit summing $H'+\alpha'$. $H'$ is the angle between the platform north line N' relative to the aircraft airframe and $\alpha'$ is the angle between the line of sight 11 and the reference structure on the aircraft airframe. The angle $(H+\alpha)$ is obtained by the aircraft from the ship by means of receiver 19 and demodulator 21 located in the aircraft. The sum of the synchro signals $(H'+\alpha')$ is compared in error signal device 22 with the demodulated R-F signal $(H+\alpha)$ received through demodulator 21. The difference or error signal i.e., $(H+\alpha)-(H'+\alpha')$ obtained from device 22, is stored in a computer and used in either of two ways. It may be used as a torque signal on the azimuth gyro which then causes the aircraft station 17 to assume the north orientation commanded by the ship. Alternatively, it can simply be stored and used as a correction within a computer.

No detailed description of the electronic devices shown in the figure is given since many instruments of known design exist which can be used to perform the individual functions discussed above.

If any structural flexure error appears greater than desired due to flexure of the ship's structure between the ship's azimuth station 13 and the azimuth transfer station 12, then the angle of flexure error may be combined with the sum of angles $H+\alpha$. Flight test calibration processes may be used to bias out any negligible flexure error in the aircraft between the optical sight or track radar and the aircraft station 17. This process would not have to be repeated except after major overhaul of the aircraft involving one of the azimuth system units or the intervening structure.

It will thus be apparent that the new system has numerous inherent advantages. For instance, after the aircraft computer has stored the azimuth correction information, this information is available as an airborne magnetic compass correction signal. The magnetic compass correction signal can also be stored. It provides an airborne calibration for the magnetic compass free from local magnetic disturbances.

A further advantage lies in the inherent versatility of permitting the ship and the aircraft to use either the radar or optical method independently of what the other uses. For example, the ship's station might prefer to track on optical while the aircraft may wish to track the ship on radar.

A preferred embodiment of the invention has been described. Various changes and modifications however may be made within the scope of the invention as set forth in the appended claims.

What is claimed is:

1. A method of transferring azimuth information between two stations where the instruments of the first station are capable of producing more accurate azimuth information than the instruments of the second station which comprises determining a line of sight between said first station and said second station, measuring a first angle between said line of sight and a first north direction information line at said first station, measuring a second angle between said line of sight and a second north direction information line at said second station, and producing a difference signal at said second station from a comparison of said first angle and said second angle whereby the more accurate azimuth information at said first station will then be available at said second station.

2. A method of transferring azimuth information between a surface station and an aircraft station which is airborne which comprises flying of said aircraft station toward said surface station in order to determine a line of sight, measuring a first angle between said line of sight and north direction information at said surface station, measuring a second angle between said line of sight and north direction information at said aircraft station, and producing a difference signal at said aircraft station from a comparison of said first angle and said second angle whereby the more accurate azimuth information at said surface station will then be available at said aircraft station.

3. An azimuth information transfer system comprising means for obtaining a line of sight between a surface station and an airborne aircraft station, means for measuring a first angle between said line of sight and a surface station reference line, means for measuring a second angle between a first north information line and said surface station reference line, means for measuring a third angle between said line of sight and an aircraft station reference line, means for measuring a fourth angle between a second north information line and said aircraft station reference line, a first summing means for combining said first angle with said second angle, a second summing means for combining said third angle with said fourth angle, a modulator to receive information from said first summing means and convey it to a transmitter, said transmitter sending said information from said modulator to a receiver located in said airborne aircraft station, said receiver conveying said information from said surface station to a demodulator, a comparison means receiving information from said first summing means and said demodulator whereby a difference signal is obtained for use in correcting the azimuth instruments in said airborne aircraft station.

4. An azimuth information transfer system as described in claim 3 wherein the first summing means and the second summing means are a first differential synchro and a second differential synchro respectively.

5. A method of transferring azimuth information between two stations where the instruments of the first station are capable of producing more accurate azimuth information than the instruments of the second station which comprises establishing a line of sight between said first station and said second station, measuring a first angle between said line of sight and a first azimuth information line at said first station, measuring a second angle between said line of sight and a second azimuth information line and producing a difference signal at said second station from a comparison of said first angle and said second angle whereby the more accurate azimuth information at said first station will then be available at said second station.

6. An azimuth information transfer system capable of providing more accurate azimuth information from a first station to a second station comprising means for establishing a line of sight between said first station and said second station, means for measuring accurately a first angle between said line of sight and a first azimuth information line at said first station, means for measuring a second angle between said line of sight and a second azimuth information line at said second station, means for transferring the first angle information to said second station and means for producing an error signal at said second station from a comparison of said first angle to said second angle whereby the more accurate azimuth information at said first station will be available at said second station.

References Cited in the file of this patent

"Navigation and Compass Deviations," by W. C. P. Muir, 4th edition, 1918, the Lord Baltimore Press, Baltimore, Maryland, pages 67–68 relied on.